Patented Sept. 6, 1932

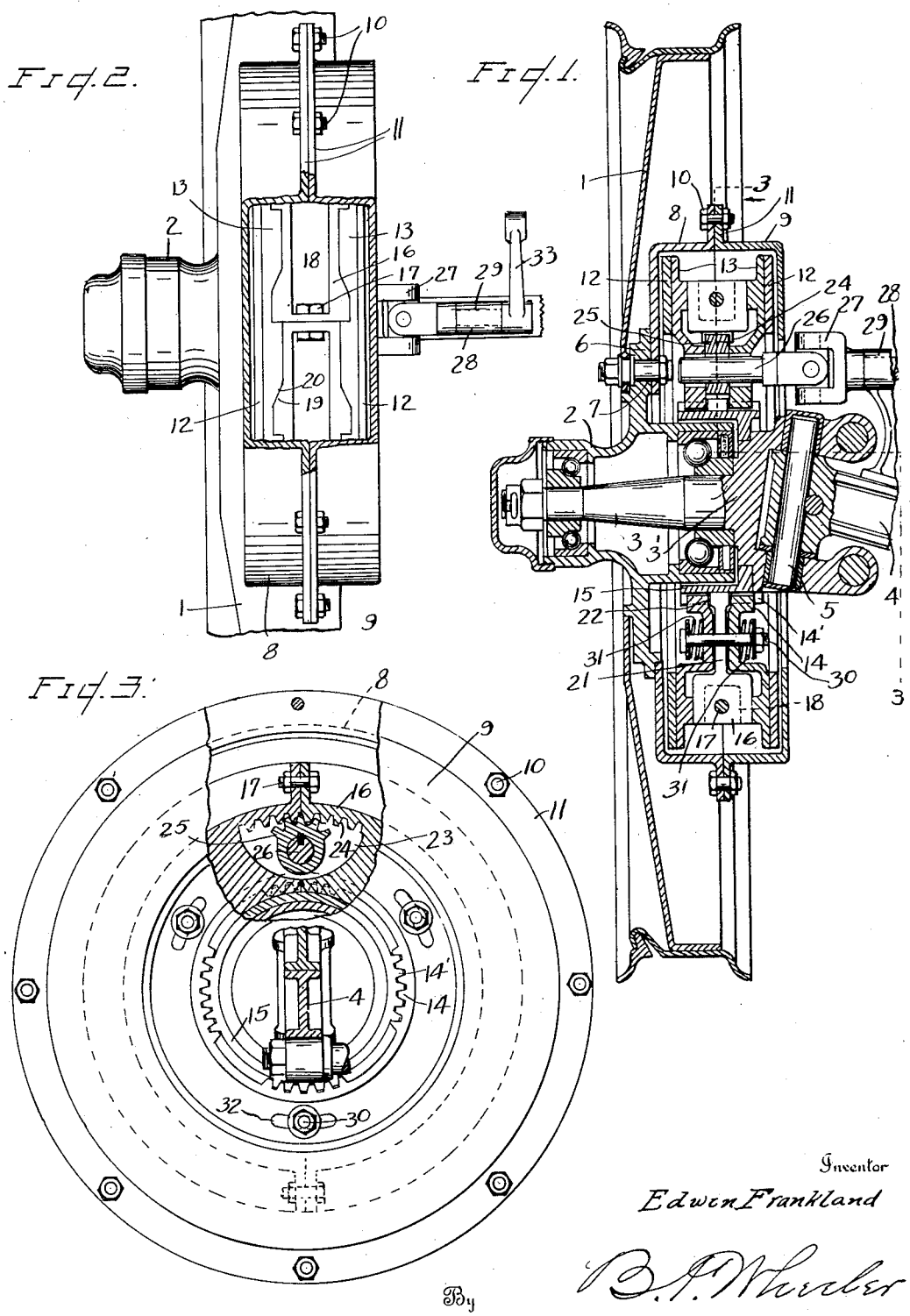

1,875,434

UNITED STATES PATENT OFFICE

EDWIN FRANKLAND, OF PONTIAC, MICHIGAN, ASSIGNOR TO BENDIX BRAKE COMPANY, OF SOUTH BEND, INDIANA, A CORPORATION OF ILLINOIS

BRAKE FOR MOTOR VEHICLES

Application filed December 19, 1923. Serial No. 681,501.

This invention relates to brakes and more particularly to motor vehicle brakes.

The major objects of the invention are to provide a brake readily applicable to the front as well as to the rear wheels of a motor vehicle; to largely increase the effective frictional contact area, as compared to present practice, without sacrifice of compactness; to provide improved facilities for dissipation of frictional heat; to effect a substantially equal distribution of pressure over the entire area of frictional contact; to permit a reduction of pressure, as compared to present practice, by increasing the area of frictional contact; to insure positively smooth and uniform retardation, and to eliminate necessity for mechanical or other adjustments during the entire life of the friction facing.

In attaining these objects the invention contemplates providing engaging braking faces transverse to the axis of the wheel to which the brake is applied, and in its preferred form the invention provides a pair of non-rotative disk braking members oppositely actuable, axially of the wheel to engage corresponding faces of a drum fast upon the wheel.

A preferred embodiment of the invention is hereinafter described and is illustrated in the accompanying drawing, wherein, Fig. 1 is a vertical axial sectional view of a motor vehicle front wheel equipped with the improved brake.

Fig. 2 is a top plan view of the same, with a portion of the brake drum broken away.

Fig. 3 is a sectional view transverse to the axis of rotation, taken on line 3—3 of Fig. 1.

In these views the reference character 1 designates a wheel body of the disk type, 2 the hub thereof, 3 a spindle wherein said hub is journaled, 3′ a knuckle bearing integral with said spindle, 4 a front axle, and 5 a king pin swivelly mounting the knuckle bearing 3′ upon said axle for steering purposes. Secured rigidly to a flange 6 of said hub, by bolts 7, is a two-part brake drum 8—9. The two parts of said drum meet in the central plane of rotation of the drum, being rigidly connected by bolts 10 engaging abutting annular flanges 11 exteriorly formed upon said parts and both parts of said drum having opposed annular disk portions (see Fig. 1) the inner faces of which serve as friction surfaces. These surfaces are engageable by the linings 12 of a pair of spaced annular brake shoes 13. To restrain said shoes from rotation while permitting sliding thereof axially of the brake drum, teeth 14 are formed at intervals upon the inner edges of said shoes and are meshed with corresponding external teeth 14′ upon a supporting collar or guide member 15, fast upon the knuckle bearing 3′. Between said shoes is arranged a cam ring 16 formed in two diametrically joined halves, bolted together as indicated at 17. Said ring is formed with an exterior channel 18 to detract from its weight, and its lateral faces are formed at intervals with opposed cam inclines 19 to co-act with corresponding inclines 20 upon the inner faces of the shoes 13. Provision is made for rotating the ring 16 sufficiently to effect a spreading of the shoes 13 into braking engagement with the drum by co-action of the cam faces 19 and 20. A web 21 is inwardly extended from the cam ring 16 and is journaled upon the collar 15, the latter having a central annular channel or groove 22 to receive said web. In the upper portion of said web, there is formed an opening 23 having its outer margin forming a section of an internal gear, as indicated at 24, and with said gear section there is meshed a segmental pinion 25, fast upon a shaft 26 parallel to the axis of the wheel. Said shaft is journaled at each side of said pinion in the members 13. Said shaft projects through the central opening in the part 9 of the drum and is connected by a universal joint 27 with a brake control shaft 28 journaled in a bearing 29 surmounting the axle. Said universal joint is centered in the extended axis of the king pin 5, thus making the actuating connection to the pinion 25 operative in any steering position of the wheel 1. At suitable circumferential space intervals, bolts 30 connect the members 13, springs 31 being coiled upon the end portions of said bolts urging said members toward each other to normally release said members from braking engagement with the drum.

The web 21 is formed with arcuate slots through which the bolts 30 pass, said slots permitting rotation of the ring 16 and integral web 21 without hindrance by said bolts. 33 designates the usual arm mounted upon the shaft 28 for rocking the same.

In the operation of the invention, when the arm 33 is rocked, the shafts 28 and 26 and the pinion 25 are correspondingly actuated. Said pinion, acting upon the gear section 24 rocks the cam ring 16, and the cam faces 19 of said ring act upon the cam faces 20 of the brake shoes 13, spreading the latter and forcing their lined faces into braking engagement with the disk faces of the brake drum, with an intensity proportioned to the angle through which the arm 33 is rocked. When application of the braking force ceases, the springs 31 urge the annular brake shoes toward each other and clear of the brake drum. The engagement of said brake shoes with the collar 15, established by the enmeshed teeth 14 and 14', restrains said shoes from rotation, while permitting them to slide freely to and from each other. The ring 16 is centered relative to the disk portions of the brake drum 8—9 by the mounting of said ring in the channel 22 of the collar 15. Said ring has sufficient lateral play in said channel to insure equalization of the braking stresses acting upon the two members 13.

The disk braking faces in the described invention provide a much increased effective area of friction engagement as compared to either an expanding or contracting type of brake band, and furthermore the invention accomplishes an equalization of the braking force per unit of friction area that is as a rule lacking in the ordinary expansion or contraction brakes.

What I claim is:

1. In a vehicle brake, the combination with a vehicle wheel, and a brake drum carried thereby having a disk wall, of a spindle forming a journal for said wheel, a member rigidly connected with said spindle and having a series of teeth elongated parallel to the wheel axis, a brake shoe mounted within the drum, slidable into and out of engagement with said disk wall of the drum, and having teeth meshed with those of said toothed member, to restrain said brake shoe from rotation, and means for actuating said brake shoe laterally.

2. In a vehicle brake, the combination with a vehicle wheel having a hub, and a brake drum carried thereby, having a disc wall, of a spindle passing through said hub, and journaling said wheel, a collar having an end thereof rigidly mounted upon said spindle and projecting around the wheel hub, a brake shoe mounted within said drum slidable upon said collar into and out of engagement with said disc wall of the drum, and restrained from rotation by said collar, and means for actuating said brake shoe slidingly.

3. A brake, including a non-rotatable part, a set of braking elements associated therewith, a rotatable part, a set of braking elements associated therewith for frictional engagement with the first mentioned set of braking elements, one of the sets of braking elements being freely movable as a unit axially of the assembly whereby to neutralize axial thrust, and centering means for maintaining such set in uniformly spaced relation to the other set when the brake is not in operation including an axially floating mechanical actuator interposed between said sets of braking elements.

4. A brake, including a non-rotatable part, a set of braking elements associated therewith, a rotatable part, a set of braking elements associated therewith for frictional engagement with the first mentioned set of braking elements, one of the sets of braking elements being freely movable as a unit axially of the assembly whereby to neutralize axial thrust, and centering means for maintaining such set in uniformly spaced relation to the other set when the brake is not in operation, including a member seated in a channel in the non-rotatable part for limiting the movement of such set as a unit axially of the assembly, and springs tending to hold the axially movable set against the centering means.

5. A brake for a swivelled wheel, including, in combination with the spindle and wheel of a vehicle, a plurality of disk-like portions connected with the spindle and presenting two oppositely facing friction surfaces, one or more disk-like portions connected with the wheel and presenting two oppositely facing friction surfaces for engagement with the two first mentioned surfaces to brake the wheel, the disk-like portion or portions presenting two of the surfaces being freely movable as a unit axially of the assembly to neutralize axial thrust and means for causing frictional engagement of said portions without interfering with swivelling the wheel.

6. In a motor vehicle, the combination with a wheel and axle and a pressure plate upon the wheel, of a brake support connected with the axle, a grooved guide member upon said support a cam ring revolubly guided by said member through contact of inner peripheral portions of the ring with the bottom of said groove, a brake element adapted to be moved by the ring into engagement with said pressure plate, and means for revolving the ring.

7. In a motor vehicle, the combination with a wheel and axle and a pressure plate upon the wheel, of a brake support connected with the axle, a cam ring revolubly held by said support through contact of inner peripheral portions of the ring therewith, an axially movable brake ring carried by said support and adapted to be moved by the cam ring into engagement with said pressure plate, and means for revolving said cam ring upon said support.

8. A brake, including a non-rotatable part having in association therewith parallel friction members movable axially of the assembly, a rotatable part having in association therewith parallel friction members adapted to be engaged by the first mentioned members to brake the rotatable part, one set of said members secured together at their outer edges to form a housing over-hanging and enclosing the other set, and mechanical means to move the first mentioned members in opposite directions into such engagement.

In testimony whereof I sign this specification.

EDWIN FRANKLAND.